United States Patent [19]

Ishiwata et al.

[11] Patent Number: 6,125,009
[45] Date of Patent: *Sep. 26, 2000

[54] MAGNETORESISTIVE EFFECT COMPOSITE HEAD HAVING A POLE CONTAINING CO-M

[75] Inventors: Nobuyuki Ishiwata; Tsutomu Ishi; Kiyokazu Nagahara; Kazumasa Kumagai, all of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/979,179

[22] Filed: Nov. 26, 1997

[30] Foreign Application Priority Data

Nov. 28, 1996 [JP] Japan .................................. 8-317929

[51] Int. Cl.$^7$ ...................................................... G11B 5/39
[52] U.S. Cl. ............................................................ 360/113
[58] Field of Search ..................................... 360/113, 126

[56] References Cited

U.S. PATENT DOCUMENTS 5,606,478   2/1997   Chen ........................................ 360/113

FOREIGN PATENT DOCUMENTS 9-293209   of 0000   Japan .
9-326105   of 0000   Japan .
5-347013  12/1993   Japan .

OTHER PUBLICATIONS

Robert P. Hunt, "A Magnetoresistive Readout Transducer", *IEEE Transactions on Magnetics,* vol. Mag. 7, No. 1, Mar. 1971, pp. 150–154.

Ching Tsang et al., "Design, Fabrication & Testing of Spin–Valve Read Heads for High Density Recording", *IEEE Transactions on Magnetics,* vol. 30, No. 6, Nov. 1994, pp. 3801–3806.

*Primary Examiner*—A. J. Heinz
*Attorney, Agent, or Firm*—Sughrue, Mion, Zinn, Macpeak & Seas, PLLC

[57] ABSTRACT

In a magnetoresistive effect composite head, magnetic shields oppose each other on a slider main body made of a ceramic material through a predetermined gap, and a magnetoresistive effect element is sandwiched and stacked between the magnetic shields with a magnetic spacer layer made of an insulator. A recording head portion uses one of the magnetic shields as a first magnetic pole, and has a second magnetic pole formed on a surface of the first magnetic pole opposite to the magnetoresistive effect element through a magnetic gap, to record information on a recording medium by means of a magnetic field generated in the magnetic gap. The magnetoresistive effect element includes a central region made of a spin-valve element to sense a medium field, and end regions for supplying a bias field and a current to the central region. The second magnetic pole is constituted by a stacked film of first and second magnetic films having different saturation magnetizations. The first and second magnetic films are close to and far from the magnetic gap, respectively. The saturation magnetization of the first magnetic film is set to a value larger than that of the second magnetic film. A method of manufacturing the above head is also disclosed.

7 Claims, 7 Drawing Sheets

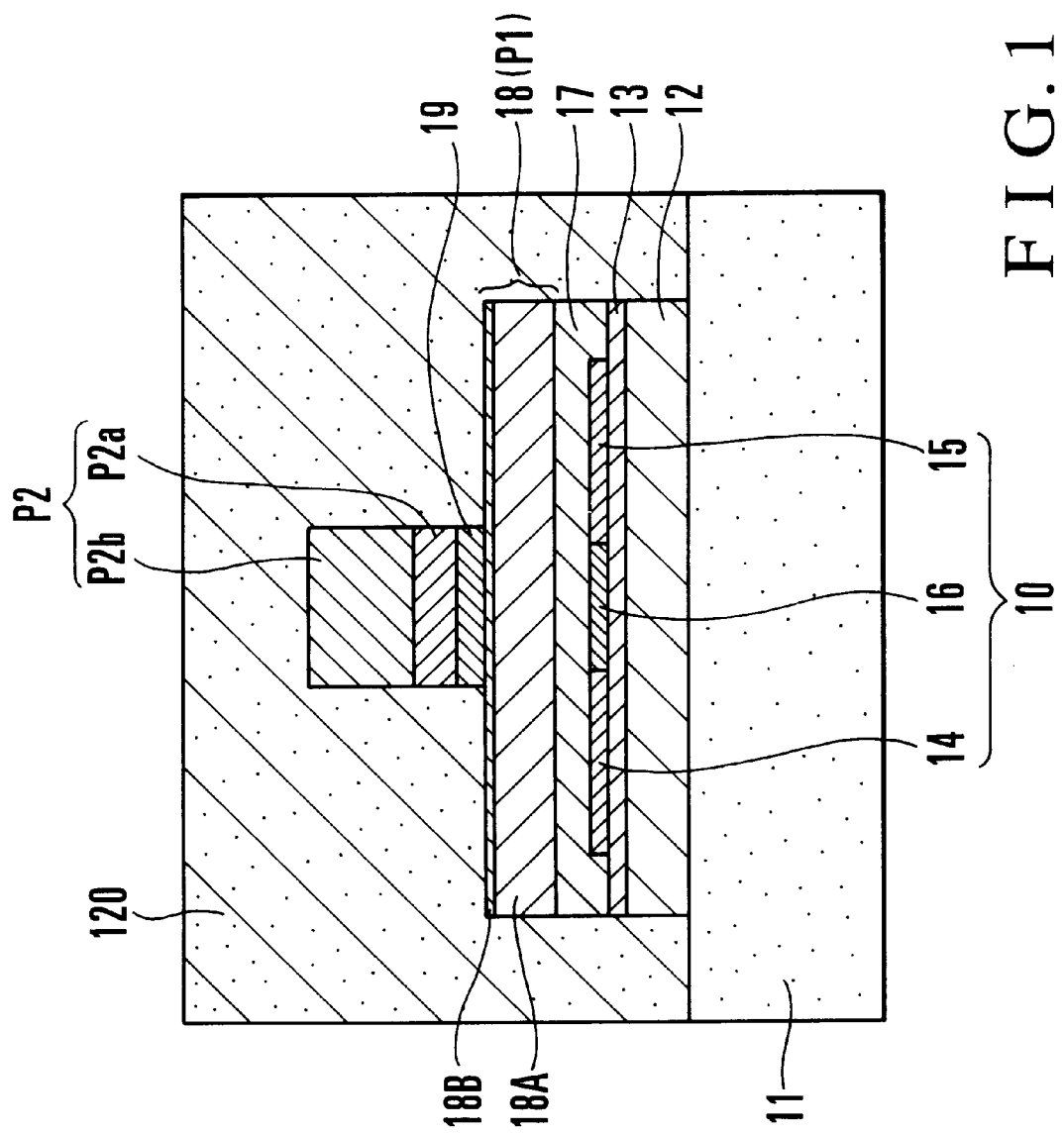
F I G. 1

MAGNETORESISTIVE EFFECT COMPOSITE HEAD HAVING A POLE CONTAINING CO-M

BACKGROUND OF THE INVENTION

The present invention relates to a magnetoresistive effect composite head and a method of manufacturing the same and, more particularly, to a magnetoresistive effect composite head having a reproducing head portion and a magnetic recording head portion that exploits the magnetoresistive effect and a method of manufacturing the same.

In recent years, as the magnetic recording medium is becoming down-sized and its capacity is becoming large, the relative velocity between the magnetic read head and the magnetic recording medium is becoming small, and therefore an expectation for a magnetoresistive effect head (to be referred to as an MR head hereinafter) whose reproducing output does not depend on tape velocity has become increased. This MR head is described in "A Magnetoresistive Readout Transducer", IEEE TRANSACTION ON MAGNETICS, VOL. MAG—7, NO. 1, March 1971.

A GMR head which uses the giant magnetoresistive effect (to be referred to as GMR hereinafter) that can realize a further larger increase in output than that from the MR head has come to the forefront of the technology. This GMR head is expected as a next-generation MR head since the magnetoresistive effect in which a change in resistance corresponds to the cosine between the directions of magnetization of two adjacent magnetic layers (generally called "the spin-valve effect") causes a large change in resistance with a small operating field.

An MR head which uses this spin-valve effect is described in "Design, Fabrication & Testing of Spin-Valve Read Heads for High Density Recording", IEEE TRANSACTION ON MAGNETICS, VOL. 30, NO. 6, November 1994.

Referring to FIG. 6, reference numerals 51 and 52 denote two magnetic layers at a central region 116 in an ideal state that causes the spin-valve effect. By the exchange coupling that is obtained upon stacking an antiferromagnetic film 53 on this magnetic layer 51, the magnetic layer 51 turns itself into a magnetic pinned layer 51 in which its direction of magnetization is substantially aligned with the direction of the medium field which enters the head sensor portion. The other magnetic layer 52 which is adjacent to the magnetic pinned layer 51 via a conductive layer, e.g., a Cu layer, serves as a magnetic free layer 52 whose direction of magnetization is free to change in response to the medium field. Reference numerals 52A and 52B denote permanent magnets whose directions of magnetization are constant; 12 and 18, magnetic shields; and P1 and P2, magnetic poles. This stacked structure that produces the spin-valve effect is used as the major portion of a conventional magnetoresistive effect composite head shown in FIG. 7.

The conventional magnetoresistive effect composite head (to be abbreviated as the composite head hereinafter) shown in FIG. 7 will be described. The composite head shown in FIG. 7 has a slider main body 111 made of a ceramic material, and a pair of magnetic shields 112 and 118 stacked on the slider main body 111 and opposing each other through a predetermined gap. Stacked magnetic spacer layers 113 and 117 made of insulators are formed between the magnetic shields 112 and 118. A central region 116 and end regions 114 and 115 are formed in the magnetic spacer layers 113 and 117. The central region 116 is a stacked structure which produces the spin-valve effect. The end regions 114 and 115 are located on the two sides of and on the same plane as that of the central region 116 to supply a current and a bias field to the central region 116.

Reference numeral 120 denotes a protection film made of alumina or the like. A magnetoresistive effect element 110 formed of the central region 116 and end regions 114 and 115 constitutes a reproducing head that reads.

Of the magnetic shields 112 and 118, the upper shield 118 forms one magnetic pole P1. The other magnetic pole P2 is stacked, on a surface of the magnetic pole P1 which is opposite to the central region 116, via a magnetic gap 119 to lie parallel to the magnetic pole P1 (upper shield 118).

A coil (not shown) sandwiched by insulators is arranged slightly behind the magnetic poles P1 and P2. A magnetic flux leaking from the magnetic gap 119 between the magnetic poles P1 and P2 that are magnetized by the magnetic field generated by this coil performs recording. A structure in which this recording head and the reproducing head described above are stacked constitutes a practical magnetoresistive effect composite head that makes use of the spin-valve effect.

In this case, as shown in FIG. 6 that indicates the ideal state, the direction of magnetization of one of the two adjacent magnetic layers must be locked to be parallel to the medium field so that this magnetic layer becomes a magnetic pinned layer 51, and the other magnetic layer becomes a magnetic free layer 52 the magnetization of which is free to rotate in response to the medium field. This is indispensable in realizing appropriate head operation.

The direction of magnetization of this magnetic pinned layer is perpendicular to the easy axis of magnetization of the magnetic shields (upper and lower shields) constituting the composite head and of the magnetic poles of the inductive head (ID head) that records. When a heat magnetic field treatment is performed to stabilize the magnetization of the spin-valve magnetic pinned layer at the central region, the magnetic anisotropy of the magnetic shields and of the respective recording magnetic poles is reversed. In contrast, when a heat magnetic field treatment is performed to stabilize the magnetic anisotropy of the magnetic shields and of the recording magnetic poles, the magnetization of the spin-valve magnetic pinned layer becomes unstable. These problems present a large obstacle to putting a composite head made of a spin-valve element into practical use.

SUMMARY OF THE INVENTION

It is an object of the present invention to provide a magnetoresistive effect composite head in which the operation of a reproducing MR head portion and a recording ID head portion using a spin-valve element and constituting a composite head is stabilized, and a method of manufacturing the same.

In order to achieve the above object, according to the present invention, there is provided a magnetoresistive effect composite head comprising a reproducing head portion having a pair of magnetic shields and a magnetoresistive effect element, the pair of magnetic shields opposing each other on a slider main body made of a ceramic material through a predetermined gap, and the magnetoresistive effect element being sandwiched and stacked between the magnetic shields with a magnetic spacer layer made of an insulator, and a recording head portion using one of the magnetic shields as a first magnetic pole and having a second magnetic pole formed on a surface of the first magnetic pole opposite to the magnetoresistive effect element through a magnetic gap, the recording head portion recording information on a recording medium by means of a magnetic field generated in the magnetic gap, wherein the magnetoresistive effect element includes a central region made of a spin-valve element to sense a medium field, and end regions for supplying a bias field and a current to the central region, and the second magnetic pole is constituted by a stacked film of first and second magnetic films having different saturation magnetizations, the first magnetic film being close to the magnetic gap and the second magnetic film being far from the magnetic gap, and the saturation magnetization of the first magnetic film being set to a value larger than that of the second magnetic film.

BRIEF DESCRIPTION OF THE DRAWINGS

FIG. 1 is a sectional view of the main part of a composite head according to the first embodiment of the present invention;

DESCRIPTION OF THE PREFERRED EMBODIMENTS

Figure 2:
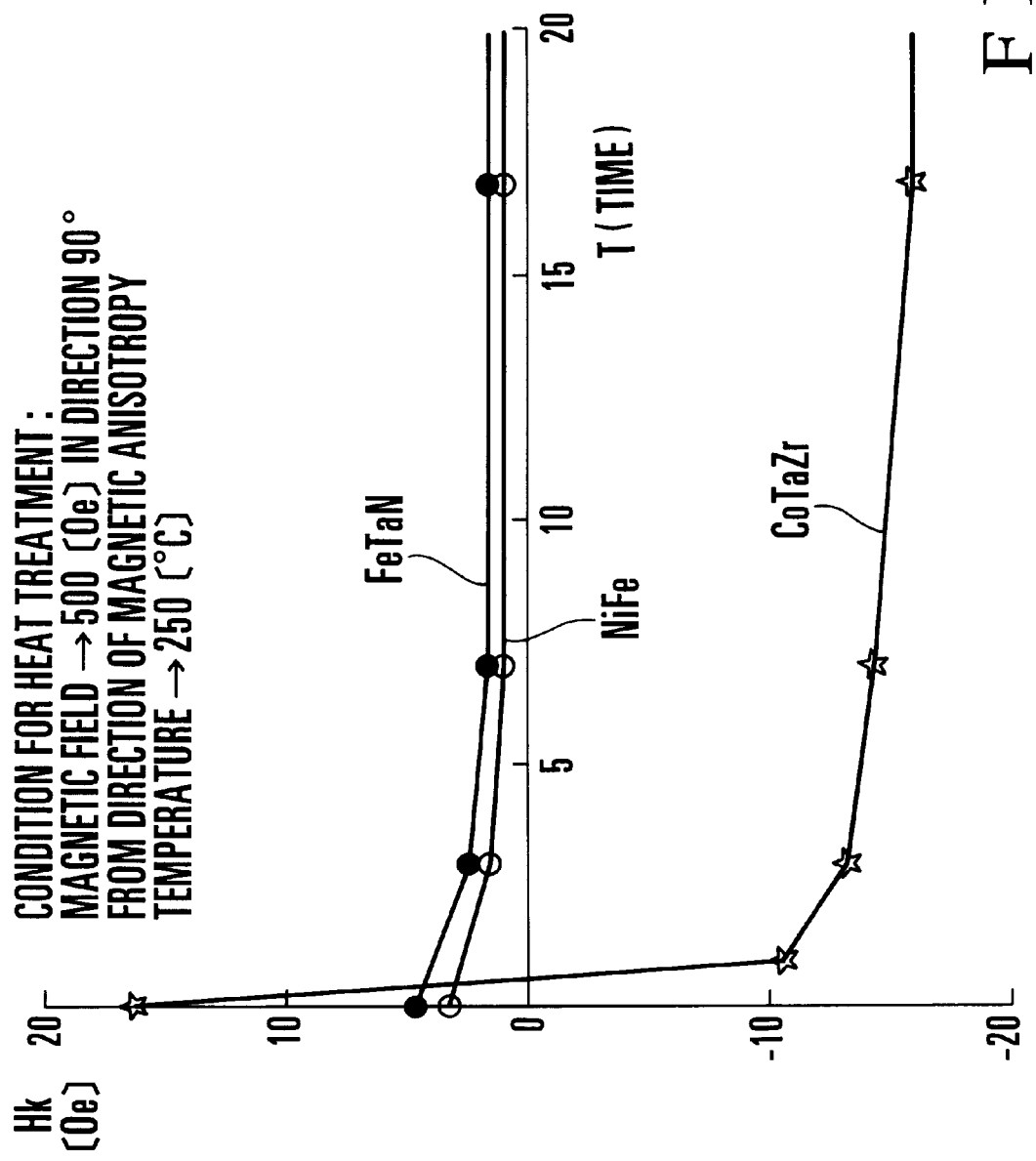
FIG. 2 is a graph showing changes in anisotropy field obtained when the magnetic shields shown in FIG. 1 are heat-treated by applying a field in a direction different from the direction of initial anisotropy by 90°.

The present invention will be described in detail with reference to the accompanying drawings.

FIG. 1 shows the main part of a magnetoresistive effect composite head according to the first embodiment of the present invention, and shows a section including an MR head portion and parallel to an air bearing surface (ABS) opposing the recording medium. Referring to FIG. 1, a lower shield 12 and an upper shield 18, and an MR element 10 constitute the MR head portion having a reproducing function. The lower and upper shields 12 and 18 oppose each other through a predetermined gap on a slider main body 11 made of a ceramic material, and serve as magnetic shields. The MR element 10 is sandwiched and stacked, together with magnetic spacer layers 13 and 17 made of insulators, between the magnetic shields 12 and 18.

The upper shield 18 forms one magnetic pole P1. A coil (not shown) sandwiched by insulators, and the other magnetic pole P2 are stacked on a surface of the magnetic pole P1 which is opposite to the MR element 10, to lie parallel to the magnetic pole P1, thereby constituting a recording head portion.

This recording head portion records on the magnetic recording medium by means of a magnetic field generated by a magnetic gap 19 arranged between the magnetic poles P1 and P2. More specifically, the recording ID head portion and the reproducing MR head portion constitute the magnetoresistive effect composite head (composite head).

Figure 6:
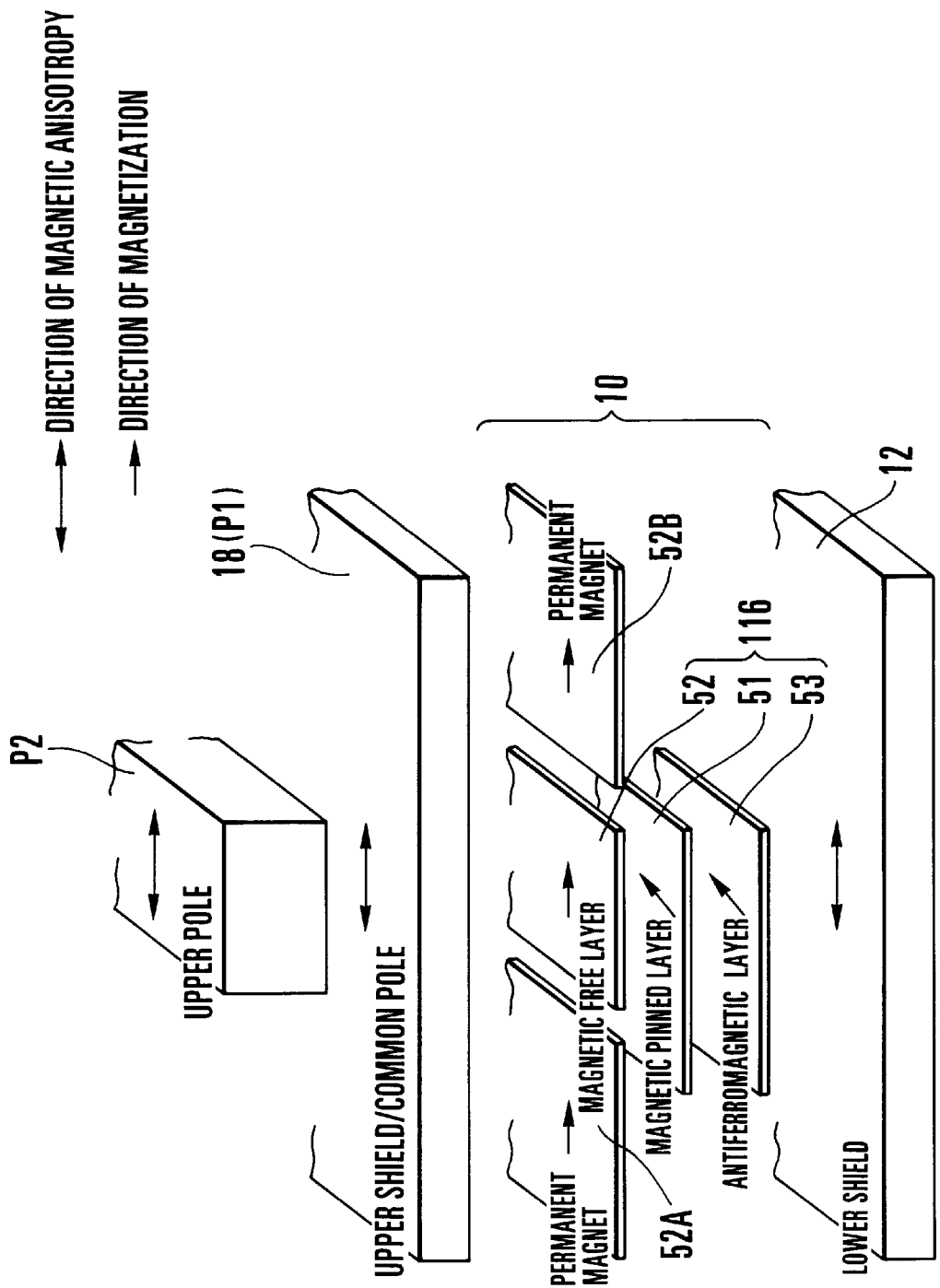
FIG. 6 is a view showing the direction of magnetic anisotropy and the direction of magnetization in an ideal state of an MR reproducing/ID recording head using the spin-valve effect.
Figure 7:
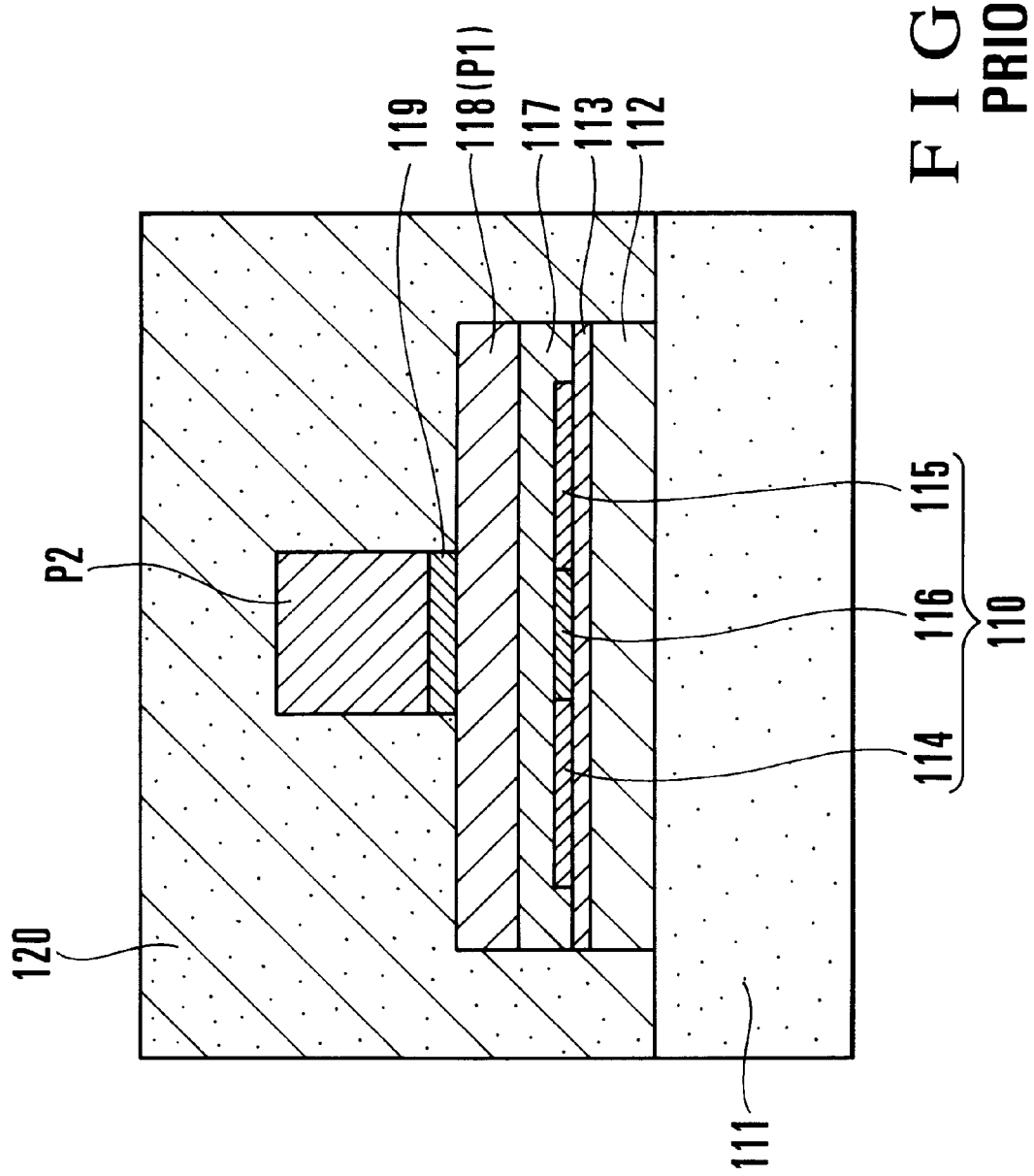
FIG. 7 is a sectional view of the main part of a conventional composite head.

The MR element 10 is constituted by a central region 16 that senses the medium field, and end regions 14 and 15 for supplying a bias field and a current to the central region 16. As shown in FIG. 6 indicating the ideal state, in the central region 16, the MR element 10 has two adjacent magnetic layers. Magnetization of one of the two magnetic layers is locked such that this magnetic layer forms a magnetic pinned layer 51. The other magnetic layer forms a magnetic free layer 52 the direction of magnetization of which is free to change in response to the medium field. This gives rise to a spin-valve effect (MR effect) which corresponds to the cosine between the directions of magnetization of the two adjacent magnetic layers 51 and 52.

The upper shield 18, i.e., the magnetic pole P1, consists of a stacked layer of two types of magnetic films 18A and 18B having different saturation magnetizations. The characteristic feature of this embodiment resides in that, of the two types of magnetic films 18A and 18B, the magnetic film 18B which is far from the MR element 10, i.e., which is adjacent to the gap 19 of the ID head, is made of a member having larger saturation magnetization than that of the magnetic film 18A which is close to the MR element 10.

The magnetic pole P2 formed to oppose the magnetic pole P1 through the magnetic gap 19 consists of a stacked layer of two types of magnetic films P2a and P2b having different saturation magnetizations. In this case, of the two types of magnetic films P2a and P2b, the magnetic film P2a closer to the magnetic gap 19 has saturation magnetization which is larger than that of the magnetic film P2b far from the magnetic gap 19.

In the composite head having the above arrangement, the lower shield 12 is made of a magnetic film containing elements Co—M (M is at least one element selected from the group consisting of elements Ti, V, Cr, Zr, Nb, Hf, Ta, and W) as a major component. It is preferable that the magnetic film containing Co—M as the major component mainly have an amorphous structure in which grains are present partly. This is because the lower shield 12 is influenced by the thermal magnetization process of the magnetic pinned layer 51 (FIG. 6) of the spin-valve film stacked on it.

As shown in FIG. 6, the direction of magnetization of the magnetic pinned layer 51 of the spin-valve film perpendicularly intersects the direction of magnetic anisotropy of the lower shield 12. To lock magnetization of the magnetic pinned layer 51, an antiferromagnetic film 53 is stacked on a soft magnetic film, e.g., an NiFe film, so that the NiFe film is magnetized in one direction by the exchange coupling field generated between the soft magnetic film and the antiferromagnetic film 53.

If an Mn-based alloy or Fe—O based oxide, which has stable exchange coupling field, is used as the material of the antiferromagnetic film 53, in order to generate a uni-directional exchange coupling field, a heat treatment must be performed while applying a uni-directional field having such a strength that can sufficiently saturate the NiFe film. For example, when an NiMn film as a typical Mn-based alloy film is employed, a heat treatment is performed at 270° C. for a period equal to or longer than 15 hours. At this time, the lower shield 12 is subjected to the heat treatment in a field which is rotated from the direction of its original magnetic anisotropy by 90°.

FIG. 2 shows an anisotropy field Hk obtained when various types of soft magnetic films that may possibly be used as the material of the lower shield 12 are heat-treated for T hours in a field which is rotated from the direction of their original magnetic anisotropy by 90°. Referring to FIG. 2, when the anisotropy field Hk has a positive value, the direction of anisotropy has been rotated by 90°.

It is apparent from FIG. 2 that although an NiFe film and an FeTaN film had initial anisotropy fields as small as several [Oe], their anisotropy fields Hk after a heat treatment at 250° C. for 17 hours were positive, showing no anisotropy reversal. However, the anisotropy fields Hk were as small as equal to or smaller than 1 [Oe]. As a result of evaluation of the frequency characteristics of permeability, with a high frequency of about 100 [MHz], the permeability decreased greatly, and the function as the shield was not fulfilled.

In a CoTaZr film (non heat-treated) as the typical amorphous material containing the element Co as the base material, although its initial anisotropy field Hk was as large as ten-odd [Oe], the anisotropy field Hk became negative upon a heat treatment, showing that the anisotropy was reversed. This CoTaZr film is immediately after it is formed by sputtering.

More specifically, as is apparent from FIG. 2, when a soft magnetic film which may possibly be used as the material of the lower shield 12 is subjected to a heat treatment in order to stabilize magnetization of the spin-valve magnetic pinned layer, its magnetic anisotropy is reversed or decreases greatly, thus losing the function as the magnetic shield.

Based on this result, the present inventors studied materials in which reversal of the magnetic anisotropy did not occur even after they were subjected to a heat treatment in order to stabilize magnetization of the spin-valve magnetic pinned layer and which had a sufficiently strong anisotropy field Hk. As a result, when a CoTaZr film was heat-treated in advance at a temperature equal to or higher than 300° C. for 1 hour, even if it was heat-treated at 270° C. for 17 hours in a field which was rotated from the direction of initial magnetic anisotropy by 90°, no reversal of magnetic anisotropy took place, and a sufficiently strong anisotropy field Hk was maintained.

Figure 3:
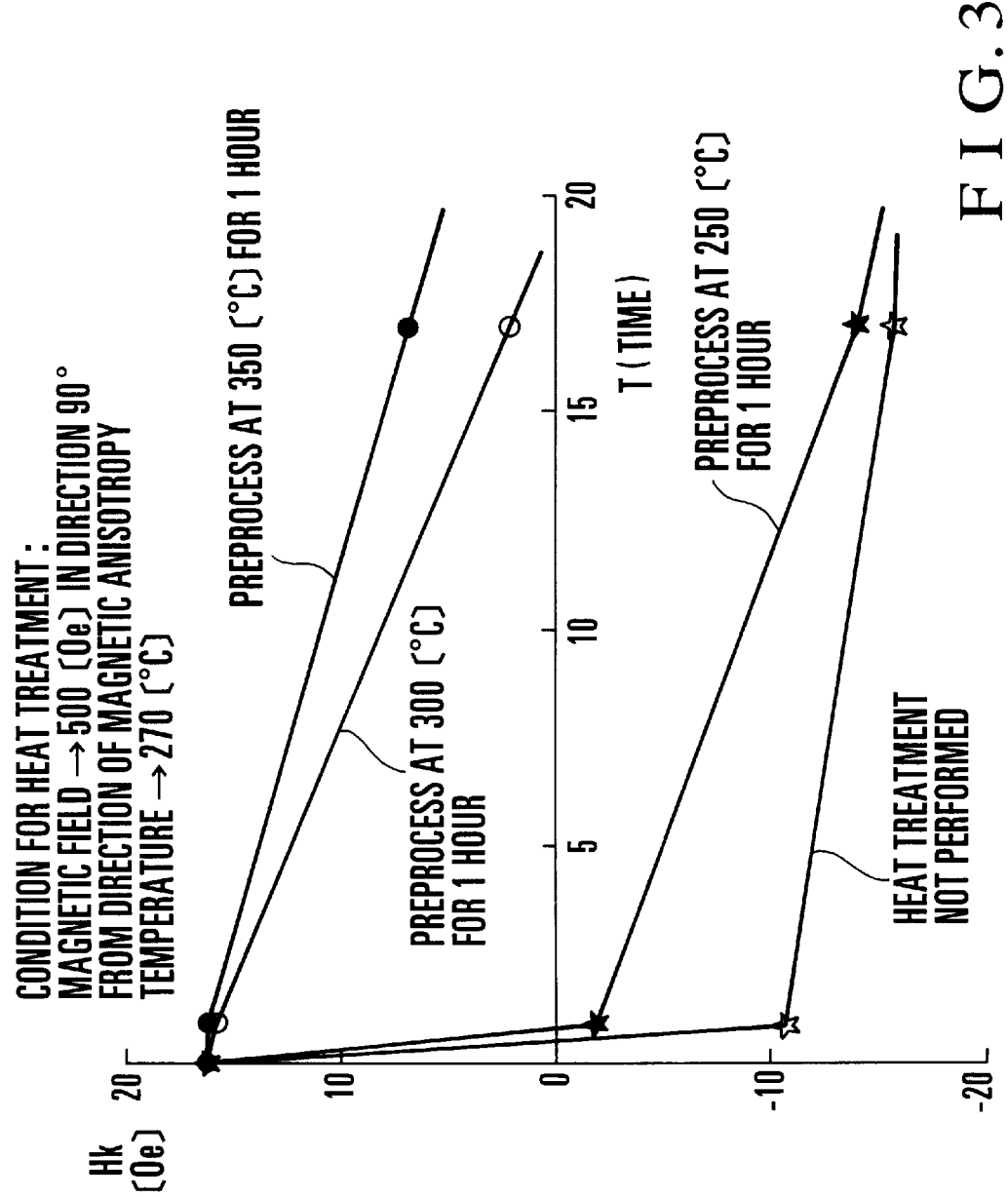
FIG. 3 is a graph showing changes in anisotropy field obtained when a CoTaZr amorphous film shown in FIG. 1 as the material of the magnetic shields or the magnetic poles is subjected to various types of initial heat treatments and is thereafter heat-treated by applying a field in a direction different from the direction of initial anisotropy by 90°.

FIG. 3 shows changes in anisotropy field Hk obtained when CoTaZr films, after being subjected to various types of heat treatments, are subjected to a heat treatment (preprocess) at 270° in a field which is rotated from the direction of initial magnetic anisotropy by 90°. As is apparent from FIG. 3, a CoTaZr film which had been subjected to a heat treatment (preprocess) at 300° C. in advance showed no anisotropy reversal even after a 17-hour heat treatment, and maintained an anisotropy field Hk of about 3 [Oe]. Also, a CoTaZr film which had been subjected to a heat treatment (preprocess) at 350° C. in advance showed no anisotropy reversal even after a 17-hour heat treatment, and maintained an anisotropy field Hk of about 8 [Oe].

In contrast to this, CoTaZr films, including a non heat-treated film, which had been subjected to a heat treatment (preprocess) at a temperature equal to or lower than 250° C. in advance showed magnetic anisotropy reversal, and the anisotropy field became −15 [Oe] after a 17-hour heat treatment. A CoTaZr film which had been subjected to a heat treatment (preprocess) at a temperature exceeding 400° C. in advance crystallized, and its soft magnetism degraded.

With a heat treatment at a temperature on the order of 300° C., although apparent crystallization does not progress, small crystals start to precipitate. The grain size of partly present crystals is equal to or smaller than 10 [nm]. Presumably, crystallization of this level does not cause degradation in soft magnetic characteristics but rather has an effect of thermally stabilizing the magnetic anisotropy of the amorphous film formed by atomic pair ordering. This effect is deemed responsible for stabilization of the anisotropy shown in FIG. 3.

Based on the above results, when a CoTaZr film, which is heat-treated at a temperature from 300° C. to or 400° C., so that fine crystal grain precipitation is partly started, is used for the lower shield 12, a lower shield 12 which, even if it is subjected to heat treatment aiming at stabilization of magnetization of the spin-valve magnetic pinned layer, shows no magnetic anisotropy reversal and has a sufficiently large anisotropy field Hk, is obtained.

To form the upper shield 18, two types of magnetic films 18A and 18B having different saturation magnetizations are used. The magnetic film 18A close to the MR element 10 is constituted by a magnetic film 18A having saturation magnetization of about 10 kG and containing NiFe as a major component. The magnetic film 18B far from the MR element 10 is constituted by a magnetic film 18B having saturation magnetization equal to or larger than 13 kG and containing Co—M (M is at least one element selected from the group consisting of Ti, V, Cr, Zr, Nb, Hf, Ta, and W) as a major component.

Since the upper shield 18 also serves as one magnetic pole P1 of the ID head, when a Co—M film having large saturation magnetization is placed adjacent to the magnetic gap 19 of the ID head, the recording performance is improved.

More specifically, when an MR head using the spin-valve effect is employed, within a practical high recording density region of equal to or larger than 3 Gb per square inch, sufficiently high recording performance cannot be obtained with conventional NiFe-film recording magnetic poles having a saturation magnetization of about 10 kG. In order to obtain sufficiently high recording performance within the high density recording region, a material having a large saturation magnetization must indispensably be employed to form the magnetic pole.

Similarly, to form the magnetic pole P2, two types of magnetic films P2a and P2b having different saturation magnetizations are used. The magnetic film P2a close to the magnetic gap 19 is constituted by a magnetic film containing elements Co—M (M is at least one element selected from the group consisting of Ti, V, Cr, Zr, Nb, Hf, Ta, and W) as a major component. The magnetic film P2b far from the magnetic gap 19 is constituted by a magnetic film containing NiFe as a major component.

In particular, since the magnetic pole P2 is on the rear side (trailing side) in the traveling direction due to the relationship between the magnetic recording medium and the MR head, the state of recording onto the medium largely changes depending on the field gradient in the magnetic gap near the magnetic pole P2. As a result, although sometimes a material having a large saturation magnetization need not be used to form the magnetic pole P1, a material having a large saturation magnetization must always be used to form the magnetic pole P2.

The magnetic pole P1 serving also as the upper shield 18, and the magnetic pole P2 must be subjected to a predetermined heat treatment. This is in order to perform a heat treatment for re-orienting the magnetization of the magnetic pinned layer 51 (FIG. 6) of the spin-valve film, which is diverted by the various types of heat treatments in the process, in the final stage of forming an element on the wafer. More specifically, if this heat treatment is to be performed in a magnetic field rotated from the direction of magnetic anisotropy by 90°, the magnetic anisotropy of the magnetic poles P1 and P2 must be stable against this heat treatment.

Figure 4:
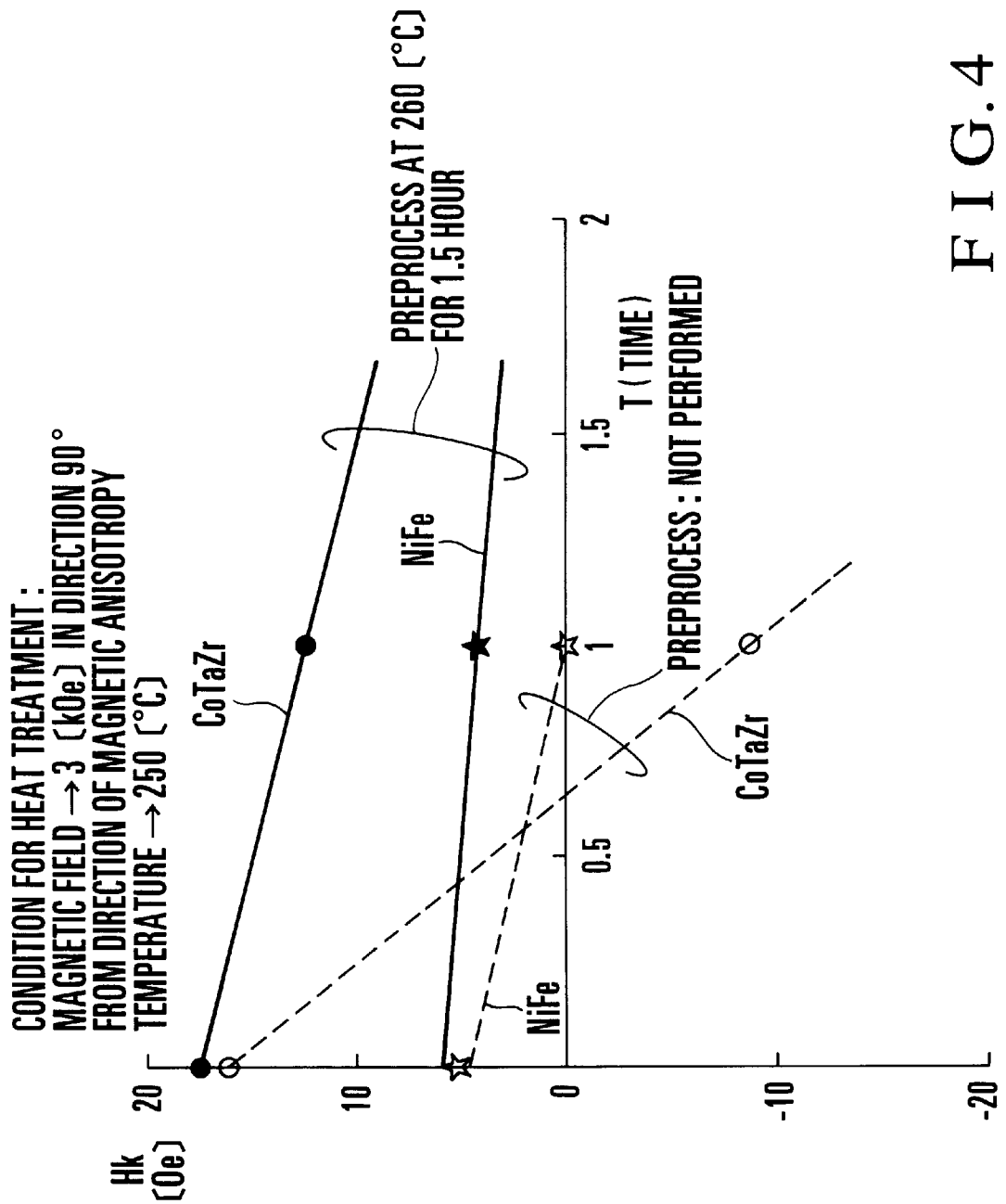
FIG. 4 is a graph showing changes in anisotropy field obtained when an NiFe/CoTaZr stacked film constituting the magnetic shields or the magnetic poles is heat-treated by applying a field in a direction different from the direction of initial anisotropy by 90° in two cases wherein the NiFe/CoTaZr stacked film is, and is not, subjected to an initial heat treatment.

FIG. 4 shows a graph indicating that when the stacked layer of an NiFe film and a CoTaZr film corresponding to the magnetic poles P1 and P2, respectively, is subjected to an initial heat treatment, a stacked film which is stable against a heat treatment that aims at re-orienting the magnetization of the magnetic pinned layer 51 (FIG. 6) of the spin-valve film can be obtained.

Referring to FIG. 4, when the stacked film of the CoTaZr film and the NiFe film respectively constituting the magnetic poles P1 and P2 and subjected to a heat treatment (preprocess) at 260° C. for 1.5 hours was subjected to a heat treatment at 250° C. for 1 hour as the re-orienting heat treatment of the spin-valve magnetic pinned layer 51 (FIG. 6), their respective anisotropy fields Hk showed no reversal in the magnetic anisotropy, and sufficiently large anisotropy fields Hk were maintained.

When the CoTaZr film constituting the magnetic pole P1 was a single layer, with a heat treatment (preprocess) at 250°, it did not form a film stable against later a heat treatment, as shown in FIG. 3. However, when this CoTaZr film was stacked with an NiFe film serving as the magnetic pole P1, with the heat treatment of 250° C. done after the heat treatment (preprocess) at 260° C. for 1.5 hours, the stacked layer had sufficiently stable magnetic anisotropy.

In this case, the appropriate range of heat treatment temperature is from 200° C. at which the anisotropy stabilization effect described above becomes apparent to 300° C. at which the soft magnetism of the NiFe film starts to degrade.

Regarding a CoTaZr film and an NiFe film (the magnetic poles P1 and P2 that were not heat-treated), when the spin-valve magnetic pinned layer 51 (FIG. 6) was subjected to a re-orienting heat treatment, the anisotropy field Hk of the NiFe film became zero (isotropic), and the anisotropy field Hk of the CoTaZr film became –10 [Oe], causing a large rotation in anisotropy.

As described above, the lower shield 12 is constituted by a magnetic film containing elements Co—M (M is at least one element selected from the group consisting of Ti, V, Cr, Zr, Nb, Hf, Ta, and W) as a major component. Regarding the two types of magnetic films having different saturation magnetizations and forming the upper shield 18 (magnetic pole P1), the magnetic film which is close to the MR element 10 is formed by a magnetic film containing NiFe as a major component, and the magnetic film which is far from the MR element 10 is formed by a magnetic film containing Co—M as a major component, thereby constituting a composite head.

Regarding two types of magnetic films having different saturation magnetizations and constituting the magnetic pole P2, the magnetic film which is close to the magnetic gap 19 is formed by the magnetic film P2a containing Co—M as a major component, and the magnetic film which is far from the magnetic gap 19 is formed by the magnetic film P2b containing NiFe as a major component.

When the respective films are subjected to appropriate heat treatments in advance, a composite head with the magnetic shields 12 and 18 and the recording magnetic poles P2, P1, which have an anisotropy field Hk sufficiently stable against the influence of the thermal magnetization of the magnetic pinned layer 51 (FIG. 6) performed after the spin-valve is formed, and against the influence of the re-orienting heat treatment of the spin-valve magnetic pinned layer performed in the wafer final step, can be obtained.

A method of manufacturing the composite head described above (mainly heat treatment process) will be described with reference to FIGS. 1 and 6.

The lower shield 12 having a predetermined thickness is formed on the slider main body 11, and a heat treatment is performed while applying, within the plane of the shield 12, a field in a direction perpendicular to the medium field. In this case, the shield 12 is constituted by a magnetic film containing Co—M (M is at least one element selected from the group consisting of Ti, V, Cr, Zr, Nb, Hf, Ta, and W) as a major component. After this magnetic film is formed, a heat treatment is performed at a temperature from 300° C. to 400° C. while applying, within the plane of the shield 12, a field sufficient for saturating the magnetization of the Co—M film in a direction perpendicular to the medium field.

After a stacked film (central region 16) that causes the spin-valve effect is formed, a heat treatment is performed while applying a field in the direction of magnetization of the magnetic pinned layer 51, as shown in FIG. 6. More specifically, a heat treatment is performed at a temperature from 200° C. to 300° C. while applying a field, sufficient for saturating the magnetization of the magnetic pinned layer 51, to be parallel to the direction of magnetization of the magnetic pinned layer 51 of the stacked film that causes the spin-valve effect. In this case, the heat treatment time falls within the range of several minutes to ten-odd hours although it differs depending on the antiferromagnetic film 53 employed.

Magnetic films constituting the magnetic pole P1 that serves also as the upper shield 18 are formed, and a heat treatment is performed while applying a field within the plane of the upper shield 18 in a direction perpendicular to the medium field.

In this case, as described above, of the two types of magnetic films of the upper shield 18 that have different magnetic saturation strengths, one close to the MR element 10 is a magnetic film containing NiFe as a major component, and one far from the MR element 10 is a magnetic film containing Co—M (M is at least one element selected from the group consisting of Ti, V, Cr, Zr, Nb, Hf, Ta, and W) as a major component. After the magnetic films for constituting the upper shield 18 are formed, a heat treatment is performed at a temperature from 200° C. to 300° C. while applying, within the plane of the upper shield 18, a field sufficient for saturating the magnetization of the magnetic films constituting the upper shield 18 in a direction perpendicular to the medium field.

This heat treatment can also serve, in the formation process of a coil (not shown) which is formed after the magnetic gap 19 of the ID head is formed on the upper shield 18 after the upper shield 18 is formed, as a step of sintering a photoresist which insulates the coil. In this step, a sufficiently large stabilization effect for the anisotropy field Hk can be obtained even if a magnetic field is not particularly applied.

After the magnetic films constituting the magnetic pole P2 are formed, a heat treatment is performed while applying a field within the plane of the upper shield 18 in a direction perpendicular to the medium field.

Of the two types of magnetic films of the magnetic pole P2 that have different saturation magnetizations, the magnetic film P2a close to the magnetic gap 19 is a magnetic film containing Co—M (M is at least one element selected from the group consisting of Ti, V, Cr, Zr, Nb, Hf, Ta, and W) as a major component, and the magnetic film P2b far from the magnetic gap 19 is a magnetic film containing NiFe as a major component.

After the two types of magnetic films P2a and P2b that constitute the magnetic pole P2 are formed, a heat treatment is performed at a temperature from 200° C. to 300° C. while applying a field, sufficient for saturating the magnetic pole P2, within the plane of the upper shield 18 (magnetic pole P1) in a direction perpendicular to the medium field.

Finally, a heat treatment is performed while applying a field in the direction of magnetization of the magnetic pinned layer 51 (FIG. 6), in order to finally align the magnetization of the magnetic pinned layer 51 of the stacked film (central region 16) that causes the spin-valve effect, diverted in the heat treatment process described above. In this case, a heat treatment is performed at a temperature from 200° C. to 300° C. while applying a field sufficient for saturating the magnetization of the magnetic pinned layer 51.

With the manufacturing method described above, a composite head is fabricated in which the direction of magnetization of the magnetic pinned layer 51 of the spin-valve film and the direction of magnetic anisotropy of the upper and lower shields 18 and 12 and of the magnetic poles P2 and P1, which perpendicularly intersect each other as shown in the ideal state of FIG. 6, are compatible.

A practical example of the first embodiment described above will be described in further detail.

Referring to FIG. 1, a CoTaZr film having a thickness 1 [μm] is formed by sputtering on a wafer substrate made of an Al$_2$O$_3$—TiO composite ceramic material as the base material of a slider main body 11, and is patterned as a lower shield 12.

When forming this lower shield 12 made of the CoTaZr film, a uni-directional field is applied in the direction of magnetic anisotropy of the lower shield 12 (FIG. 6). Thereafter, an initial heat treatment is performed at 350° C. for 1 hour while applying a uni-directional field of 500 [Oe] in the direction of magnetic anisotropy of the lower shield 12 (FIG. 6).

An alumina film having a thickness of 0.06 [μm] and serving as a reproducing magnetic gap 13 is formed by sputtering, and successively a spin-valve film (spin-valve element) serving as a central region 16 is formed by sputtering. This spin-valve film (central region 16) consists of a 30-nm thick NiMn film, a 3-nm thick NiFe film, a 2.5-nm thick Cu film, and a 6-nm thick NiFe film from the side of the magnetic gap 13 made of an alumina film in the order named.

After this spin-valve film is formed at the central region 16, an exchange coupling field is generated between the NiMn film serving as an antiferromagnetic film 53 and the NiFe film on it, as shown in FIG. 6, so that the NiFe film becomes a magnetic pinned layer 51. More specifically, an initial heat treatment is performed at 270° C. for 15 hours while applying a uni-directional magnetic field of 3 [kOe] in the direction of magnetization of the antiferromagnetic film 53 and magnetic pinned layer 51 (FIG. 6). In this case, the direction of the magnetic field perpendicularly intersects the direction of field applied when heat-treating the lower shield 12 in advance.

Since the CoTaZr film serving as the lower shield 12 is heat-treated at 350° C. in advance, its easy axis of magnetization does not change even if this spin-valve heat treatment is performed, and it has a sufficiently large anisotropy field Hk of 8 [Oe]. This is apparent from the characteristics of "preprocess at 350° C. for 1 hour" of FIG. 3.

The spin-valve film constituting the central region 16 is patterned to have a width of 1 [μm] corresponding to the read track width, and thereafter end regions 14 and 15 are formed by the sputtering lift-off method.

The end regions 14 and 15 form a stacked structure of a permanent magnet film and an electrode film. As the permanent magnet film, a CoPtCr film having a thickness of 15 [nm] is used. As the electrode film, a 150-nm thick Au film formed on a 5-nm thick Ta film as an undercoat film, is used. These two films are lifted off and are patterned into the shape of the end regions 14 and 15, thereby forming an MR element 10 consisting of the central region 16 and end regions 14 and 15.

An alumina film having a thickness of 0.09 [μm] and serving as a prospective reproducing magnetic gap 17 is formed on an MR element 10 and the magnetic spacer layer 13 by sputtering.

Thereafter, an NiFe film 18A constituting an upper shield 18 and having a thickness of 2 [μm] is formed on the alumina film forming the magnetic gap 17 by frame plating, and a CoTaZr film 18B having a thickness of 0.5 [μm] is formed on the NiFe film 18A by sputtering lift-off method. When forming the NiFe film 18A and CoTaZr film 18B, a field is applied in the direction of magnetic anisotropy of the upper shield 18 (FIG. 6).

An alumina film having a thickness of 0.35 [μm] and serving as a prospective recording magnetic gap 19 is selectively formed on the upper shield 18 by sputtering, and a field generating coil (not shown) for the recording head is formed on this alumina film. This field generating coil is insulated by vertically sandwiching it with photoresist patterns.

More specifically, a photoresist pattern serving as the lower insulator is formed on the alumina film constituting the magnetic gap 19. When thermosetting this photoresist pattern, a magnetic field is applied at 500 [Oe] in the direction of magnetic anisotropy of the upper shield 18 (FIG. 6), and a heat treatment is performed at 260° C. for 1 hour.

A Cu coil is formed by frame plating, and a photoresist pattern serving as the upper insulator is formed. When thermosetting this photoresist pattern as well, a magnetic field is applied at 500 [Oe] in the direction of magnetic anisotropy of the upper shield 18, and a heat treatment is performed at 260° C. at 1 hour. The above heat treatment for thermosetting the photoresist eventually serves to stabilize the magnetic anisotropy of the upper shield 18.

A CoTaZr film P2a having a thickness of 0.5 [μm] and constituting a magnetic pole P2 is formed on the alumina film constituting the magnetic gap 19 by sputtering, and an NiFe film P2b having a thickness of 3 [μm] is formed on the CoTaZr film by frame plating.

In this case, when forming the NiFe film P2b and CoTaZr film P2a, a field is applied in the direction of magnetic anisotropy of the magnetic pole P2 (FIG. 6). The CoTaZr film P2a is patterned by ion milling by using the NiFe film P2b on it as the mask. The width of the magnetic pole P2 is set to 1.3 [μm].

After the magnetic pole P2 is formed, a field is applied at 1 [kOe] in the direction of magnetic anisotropy of the upper shield 18 (FIG. 6), and an initial heat treatment is performed at 230° C. for 1 hour. This stabilizes the magnetic anisotropy of the magnetic pole P2. Subsequently, electrode extraction patterns for the reproducing and recording portions are formed, and thereafter the entire element is protected with a protection film 120 made of an alumina sputtering film.

Thereafter, a heat treatment is performed at 250° C. for 1 hour while applying a uni-directional field of 3 [kOe] in the direction of magnetization of the antiferromagnetic film 53 and magnetic pinned layer 51 (FIG. 6) again. Therefore, the magnetization of the magnetic pinned layer 51 of the spin-valve film is finally aligned in one direction.

In this heat treatment, the magnetic anisotropies of the upper and lower shields 12 and 18 and magnetic pole P2 maintain the directions shown in FIG. 6 because of the above-described heat treatment performed for them, and their strengths are sufficiently large for the respective functions.

The element formed by the above process is diced from the wafer, is formed into the shape of a magnetic disk slider, and is incorporated in an arm having a gimbals spring. The recording/reproducing performance of the resultant structure is evaluated. At this time, permanent magnets 52A and 52B are magnetized with an external field of 3 [kOe] in the direction shown in FIG. 6. As a result, a read waveform having a desired isolated half width is obtained, and good recording/reproducing characteristics with a small non-linear transition shift (NLTS) are obtained.

Clearly, this is because the magnetic anisotropies of the upper and lower shields 18 and 12 and of the magnetic poles P1 and P2, and magnetization of the spin-valve film are stabilized, in the same manner as in FIG. 6, by combination of the materials of the upper and lower shields 18 and 12 and of the recording magnetic poles P1 and P2 and by appropriate heat treatments for these materials.

As comparative examples, an MR head (Comparative Example 1) which is not subjected to an initial heat treatment after a CoTaZr film serving as a lower shield 12 is formed, an MR head (Comparative Example 2) which is not subjected to an initial heat treatment after a stacked film of an NiFe film P2b and a CotaZr film P2a that form an upper shield 18 is formed, and an MR head (Comparative Example 3) which is not subjected to an initial heat treatment after a stacked film of an NiFe film P2b and a CoTaZr film P2a that form a recording upper magnetic pole P2 is formed, are fabricated, and their recording/reproducing characteristics were evaluated.

As a result, in the MR head of Comparative Example 1, the half width of the isolated read waveform increases. This is probably attributed to the following reason. Since an initial heat treatment is not performed after the CoTaZr film P2a that forms the lower shield 12 is formed, the direction of magnetic anisotropy of the lower shield 12 rotates by 90° under the influence of the initial heat treatment of the spin-valve film and the influence of the field during the heat treatment performed later on, and the function as the shield is degraded.

In the MR head of Comparative Example 2, the half width of the isolated read waveform similarly increases, and the non-linear transition shift (NLTS) increases. This is probably ascribed, at least partially, to the following reason. Since an initial heat treatment is not performed after the stacked film of the NiFe film 18A and the CoTaZr film 18B that form the upper shield 18 is formed, the direction of magnetic anisotropy of the upper shield 18 rotates by 90° under the influence of the field during the heat treatment of the spin-valve film performed later on, and the function as the shield is degraded. Another plausible reason is that since the upper shield 12 also serves as one magnetic pole P1 of the recording magnetic poles, a recording field matching high frequencies ceases to be generated.

In the MR head of Comparative Example 3, an increase in NLTS is similarly observed. This may be accredited to the following reason. Since an initial heat treatment is not performed after the stacked film of the NiFe film P2b and the CoTaZr film P2a that form the upper magnetic pole P2 is formed, the direction of magnetic anisotropy of the film of the upper shield 18 rotates by 90° under the influence of the field during reheat treatment of the spin-valve film later on, and a recording field matching high frequencies ceases to be generated.

In the examples described above, the material to form the lower and upper shields 12 and 18 and the recording magnetic pole P2 is not limited to the CoTaZr film. If an amorphous film containing Co—M (M is at least one element selected from the group consisting of Ti, V, Cr, Zr, Nb, Hf, Ta, and W) as a major component is employed, the same effect as that described above can be obtained.

Regarding the temperature for heat treatment, in the lower shield 12, if the temperature falls within the range from 300° C., at which slight crystallization of the Co—M film starts, to 400° C., then the same effect as that described above can be obtained. In the lower shield 18 and the upper magnetic pole P2, a temperature falling within the range from 200° C., at which the anisotropy stabilization effect in the stacked structure of the NiFe film and Co—M film becomes conspicuous, to 300° C., at which the soft magnetism of the NiFe film starts to degrade, is appropriate. If the temperature falls within this range, the same effect as that described above can be obtained.

The material of the antiferromagnetic film 53 for stabilizing magnetization of the magnetic pinned layer 51 of the central region 16 is not limited to NiMn, and any Mn—X (X is at least one element selected from the group consisting of Cr, Fe, Ni, Pd, Ir, and Pt) which is an antiferromagnetic material containing an element Mn as a base material can be used. Also, $Fe_2O_3$ or NiO, which is an oxide antiferromagnetic material, can be used. This is because an NiMn film requires a long-term initial heat treatment at the highest temperature, while with materials other than NiMn, the conditions for the heat treatment can be equivalent to or less stricter than those for the NiMn film.

Figure 5:
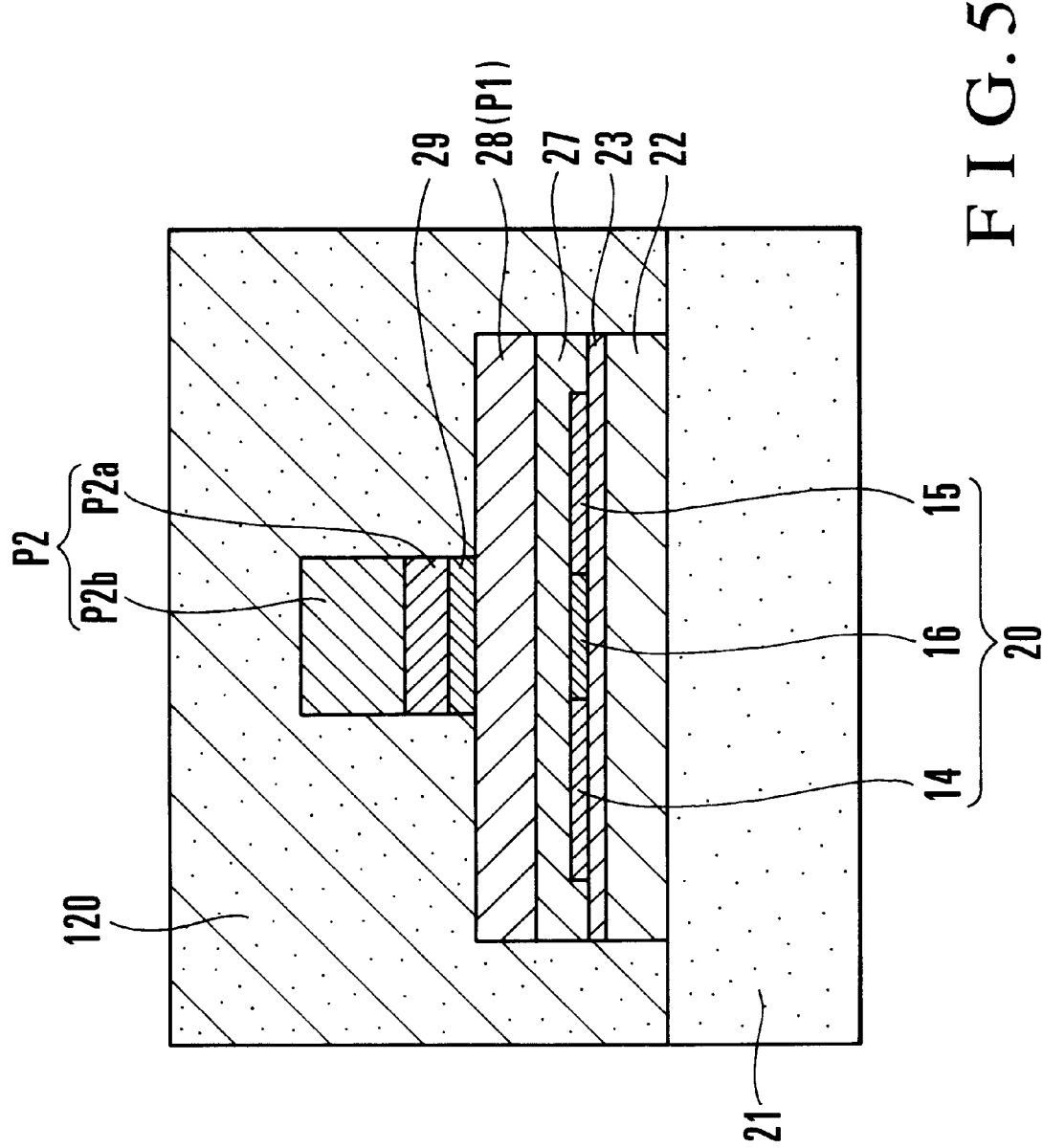
FIG. 5 is a sectional view of the main part of a composite head according to the second embodiment of the present invention.

FIG. 5 shows the main part of a composite head according to the second embodiment of the present invention.

A 1-μm thick CoTaZr film is formed by sputtering on a wafer substrate 21 made of an $Al_2O_3$—TiO composite ceramic material and forming a slider main body, and is patterned as a lower shield 22. When forming this lower shield 12, a uni-directional field is applied in the direction of magnetic anisotropy (FIG. 6) of the lower shield 22 (corresponding to the direction of magnetic anisotropy of the lower shield 12 shown in FIG. 6). Thereafter, an initial heat treatment is performed at 330° C. for 1 hour while applying a uni-directional field of 500 [Oe] in the direction of magnetic anisotropy of the lower shield 22 (corresponding to the direction of magnetic anisotropy of the lower shield 12 shown in FIG. 6).

An alumina film having a thickness of 0.06 [μm] and serving as a reproducing magnetic gap 23 is formed by sputtering, and successively a spin-valve film serving as a central region 16 is formed by sputtering. This spin-valve film (central region 16) consists of a 30-nm thick NiMn film, a 3-nm thick CiFe film, a 2.5-nm thick Cu film, and a 6-nm thick NiFe film from the side of the magnetic gap 23 (alumina film) in the order named.

After this spin-valve film (central region 16) is formed, in order to generate an exchange coupling field between the NiMn film serving as an antiferromagnetic film 53 and the NiFe film on it, as shown in FIG. 6, so that the NiFe film becomes a magnetic pinned layer 51, an initial heat treatment is performed at 270° C. for 15 hours while applying a uni-directional field of 3 [kOe] in the direction of magnetization of the antiferromagnetic film 53 and magnetic pinned layer 51. The direction of this field perpendicularly intersects the direction of the magnetic field applied when heat-treating the lower shield 22 in advance.

Since the CoTaZr film serving as the lower shield 22 is heat-treated at 330° C. in advance, its easy axis of magnetization does not change even if this spin-valve heat treatment is performed, as is apparent from the graph shown in FIG. 3, and it has a sufficiently strong anisotropy field Hk of 6 [Oe], which is sufficiently large as the shield.

The spin-valve film (central region 16) is patterned to have a width of 1 [μm] corresponding to the read track width, and thereafter end regions 14 and 15 are formed by the sputtering lift-off method. The end regions 14 and 15 form a stacked structure of a permanent magnet film and an electrode film. As the permanent magnet film, a CoPtCr film having a thickness of 15 [nm] is used. As the electrode film, a 150-nm thick Au film formed on a 5-nm thick Ta film as an undercoat, is used. These two films are lifted off and are patterned into the shape of the end regions 14 and 15.

An alumina film having a thickness of 0.09 [μm] and serving as another prospective reproducing gap 27 is formed by sputtering. Thereafter, an NiFe film having a thickness of 3 [μm] and constituting an upper shield 28 is formed by frame plating, and an NiFe film (upper shield 28) having a thickness of 3 [μm] is formed by frame plating. When forming the NiFe film (upper shield 28), a field is applied in the direction of magnetic anisotropy of the upper shield 28 (corresponding to the direction of magnetic anisotropy of the upper shield 18 shown in FIG. 6).

An alumina film having a thickness of 0.35 [μm] and serving as a prospective recording magnetic gap 29 is formed by sputtering, and a field generating coil (not shown) for the recording head is formed on this alumina film. This coil is insulated by vertically sandwiching it with photoresist patterns in accordance with the following procedure. A photoresist pattern serving as the lower insulator is formed on the alumina film constituting the magnetic gap 29. When thermosetting this photoresist pattern, a heat treatment is performed at 260° C. for 1 hour.

A Cu coil is formed by frame plating to form a photoresist pattern serving as the upper insulator. When thermosetting this photoresist pattern as well, a heat treatment is performed at 260° C. at 1 hour.

A CoTaZr film P2a having a thickness of 0.5 [μm] and constituting a recording magnetic pole P2 is formed by sputtering, and an NiFe film P2b having a thickness of 3 [μm] is formed by frame plating. When forming the NiFe film P2b and CoTaZr film P2a, a field is applied in the direction of magnetic anisotropy of the magnetic pole P2 (FIG. 6). The CoTaZr film P2a is patterned by ion milling by using the NiFe film P2b on it as a mask. The width of the magnetic pole P2 is set to 1.3 [μm].

After the magnetic pole P2 is formed, a magnetic field is applied at 1 [kOe] in the direction of magnetic anisotropy of the upper shield 28 (corresponding to the direction of magnetic anisotropy of the upper shield 18 shown in FIG. 6), and an initial heat treatment is performed at 230° C. for 1 hour. This stabilizes the magnetic anisotropy of the magnetic pole P2.

Subsequently, electrode extraction patterns for the reproducing and recording portions are formed, and thereafter the entire element is protected with an alumina sputtering film serving as a protection film 120. Thereafter, a heat treatment is performed at 250° C. for 1 hour while applying a uni-directional field of 3 [kOe] in the direction of magnetization of the antiferromagnetic film 53 and magnetic pinned layer 51 (FIG. 6) again. Therefore, the magnetization of the magnetic pinned layer 51 (the spin-valve film) is finally aligned in one direction.

In this heat treatment, the magnetic anisotropies of the lower shield 22 and recording magnetic pole P2 maintain the directions as shown in FIG. 6 because of the above-described heat treatment performed for them, and their strengths are sufficiently large for the respective functions. It has become apparent from FIG. 2 that, with the spin-valve heat treatment at 250° C. for about 1 hour, the magnetic anisotropy of the NiFe film serving as the upper shield 28 does not largely change, and maintains a stable state.

The element formed by the above process is diced from the wafer, is formed into the shape of a magnetic disk slider, and is incorporated in an arm having a ginbal spring. The recording/reproducing performance of the resultant structure is evaluated. At this time, permanent magnets 52A and 52B are magnetized with an external field of 3 [kOe], as shown in FIG. 6.

As a result, a read waveform having a desired isolated half width is obtained, and good recording/reproducing characteristics with a small non-linear transition shift (NLTS) are obtained. This is because the magnetic anisotropies of the upper and lower shields 28 and 22 and of the magnetic poles P1 and P2, and magnetization of the spin-valve film (central region 16) are stabilized, in the same manner as that shown in FIG. 6, by combination of the materials of the upper and lower shields 28 and 22 and of the recording magnetic poles P1 and P2 and by appropriate heat treatments for these materials according to the second embodiment.

Magnetization of the permanent magnets 52A and 52B in the ideal state of FIG. 6 described above can be performed basically any time after the pattern of the permanent magnets 52A and 52B is formed. Preferably, as shown in the respective embodiments described above, magnetization may be performed when the manufacturing process (particularly heat magnetic field process) of the upper and lower magnetic shields and one and the other of the magnetic poles as other constituent members is ended as shown in the respective embodiments described above. As a result, the direction of magnetization of the magnetic free layer of the spin-valve film is stabilized in the direction shown in FIG. 6, and good reproduction characteristics free from Barkhausen noise can be obtained.

As has been described above, according to the present invention, reproducing and magnetic recording can be performed with an MR head and an ID head, respectively, in which the directions of magnetization of the spin-valve element, magnetic shields, and magnetic poles are appropriately locked because the respective members function effectively or because of appropriate heat treatments, and which use the spin-valve effect that can realize stable operation. As a result, a magnetoresistive effect composite head which has high reliability that cannot be achieved conventionally, operates stably, and has high durability can be provided.

What is claimed is:

1. A magnetoresistive effect composite head, comprising:
   a reproducing head portion having a pair of magnetic shields and a magnetoresistive effect element, said pair of magnetic shields opposing each other through a predetermined gap, and said magnetoresistive effect element being sandwiched and stacked between said pair of magnetic shields with a magnetic spacer layer; and a recording head portion using one of said pair of magnetic shields as a first magnetic pole and having a second magnetic pole formed on a surface of said first magnetic pole opposite to said magnetoresistive effect element through a magnetic gap, said recording head portion recording information on a recording medium by a magnetic field generated in said magnetic gap;

wherein said magnetoresistive effect element includes a central region made of a spin-valve element to sense a medium field, and end portions for supplying a bias field and a current to said central region;

wherein one of said magnetic shields comprises a magnetic film containing a major component Co—M, wherein M is at least one element selected from the group consisting of elements Ti, V, Cr, Zr, Nb, Hf, Ta, and W; and wherein directions of magnetic anisotropies of said magnetic shield and said second magnetic pole are perpendicular to a direction of the medium field, a magnetization direction of a magnetic pinned layer as part of said magnetoresistive effect head being in parallel to a direction of the medium field.

2. A magnetoresistive effect composite head according to claim 1, wherein said second magnetic pole comprises a stacked film of first and second magnetic films having different saturation magnetization, said first magnetic film being close to said magnetic gap and said second magnetic film being far from said magnetic gap, and the saturation magnetization of said first magnetic film being set to a value larger than that of said second magnetic film.

3. A magnetoresistive effect composite head according to claim 1, wherein said one of said pair of magnetic shields comprises a stacked film of third and fourth magnetic films having different saturation magnetizations, said third magnetic film being close to said magnetoresistive element and said fourth magnetic film being far from said magnetoresistive element, and the saturation magnetization of said fourth magnetic film is set to a value larger than the saturation magnetization of said third magnetic element.

4. A magnetoresistive effect composite head according to claim 3, wherein said third magnetic film comprises a magnetic film containing NiFe as a component; and wherein said fourth magnetic film comprises a magnetic film containing Co—M, wherein M is at least one element selected from the group consisting of elements Ti, V, Cr, Zr, Nb, Hf, Ta, and W, as a component.

5. A magnetoresistive effect composite head according to claim 3, wherein said second film of said second magnetic pole contains NiFe as a component, said third film contains NiFe as a component, and said fourth magnetic film contains Co—M, wherein M is at least one element selected from the group consisting of elements Ti, V, Cr, Zr, Nb, Hf, Ta, and W, as a component.

6. A magnetoresistive effect composite head according to claim 1, wherein the other of said pair of magnetic shields comprises a magnetic film containing Co—M, wherein M is at least one element selected from the group consisting of elements Ti, V, Cr, Zr, Nb, Hf, Ta, and W, as a component; and wherein said magnetic film of said one of said pair of magnetic shields comprises a magnetic film having an amorphous structure in which crystal grains having a grain size not more than 10 nm are present.

7. A magnetoresistive effect composite head according to claim 1, wherein said second film of said second magnetic pole contains NiFe as a component.

* * * * *